Jan. 13, 1925.  
P. BARDUCCI  
DRYING PLANT  
Filed Aug. 25, 1922  3 Sheets-Sheet 1

Inventor:
P. Barducci

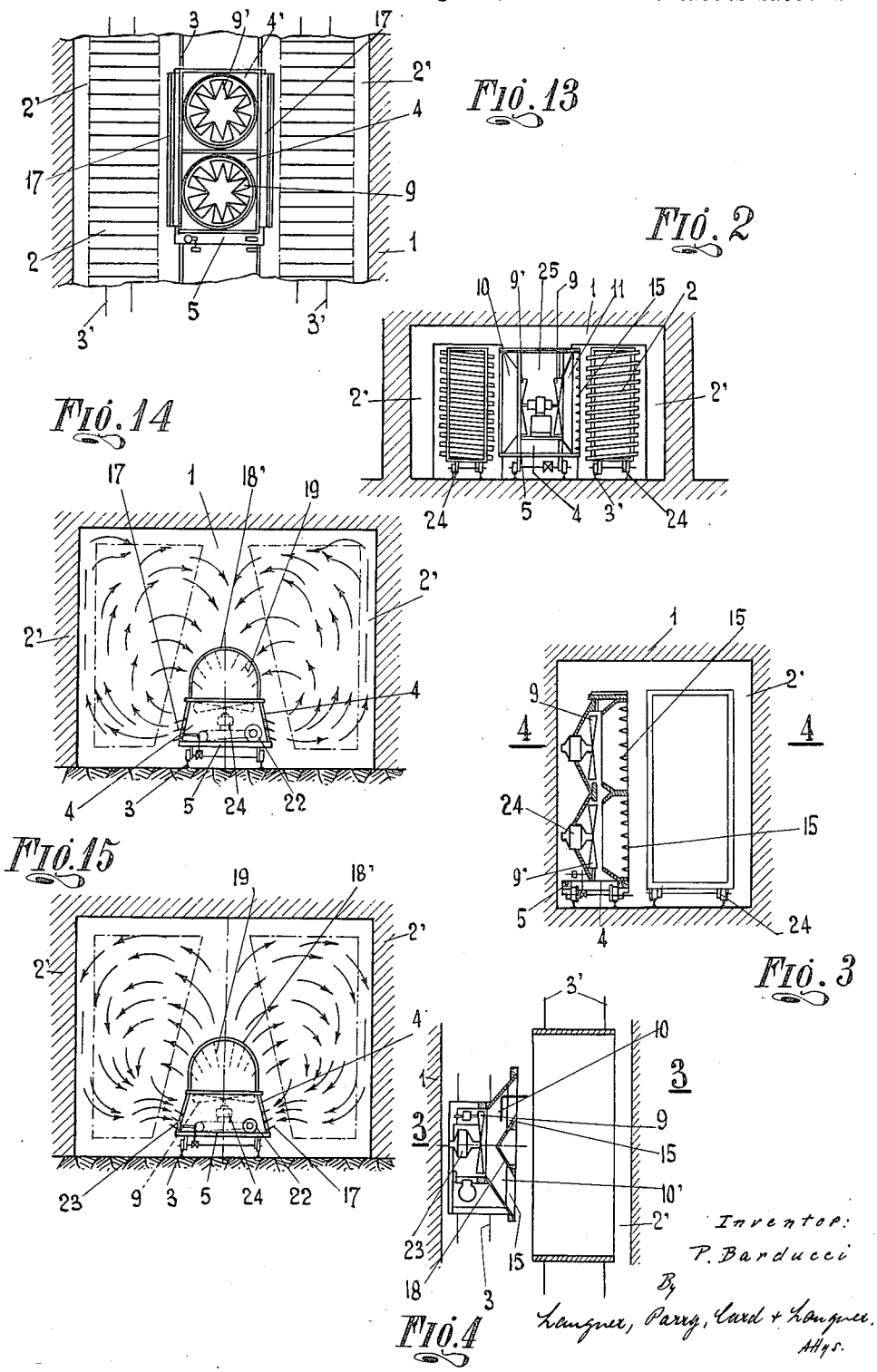

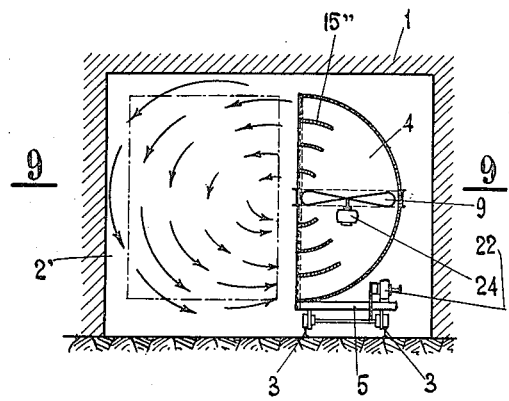
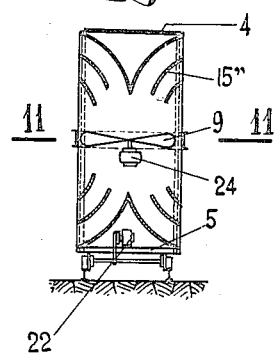
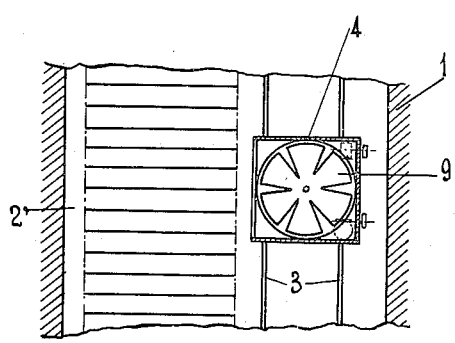
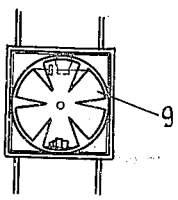
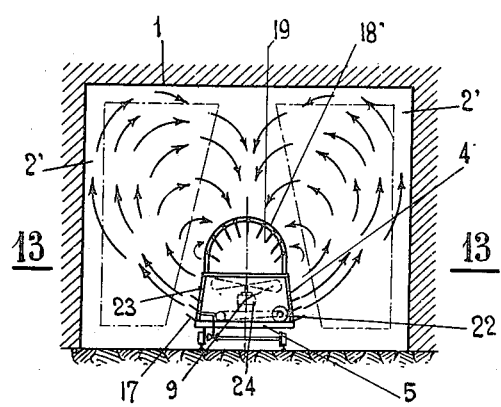

Patented Jan. 13, 1925.

1,522,667

UNITED STATES PATENT OFFICE.

PILADE BARDUCCI, OF MILAN, ITALY.

DRYING PLANT.

Application filed August 25, 1922. Serial No. 584,335.

*To all whom it may concern:*

Be it known that I, PILADE BARDUCCI, a subject of the King of Italy, residing at Milan, Italy, have invented new and useful Improvements in Drying Plants; and I do hereby declare the following to be a full, clear, and exact description of the same.

The present invention relates to drying plants and has for its object a drying plant comprising a travelling ventilating device which moves along the material to be dried and has means for producing air streams acting on the material.

Figure 1:
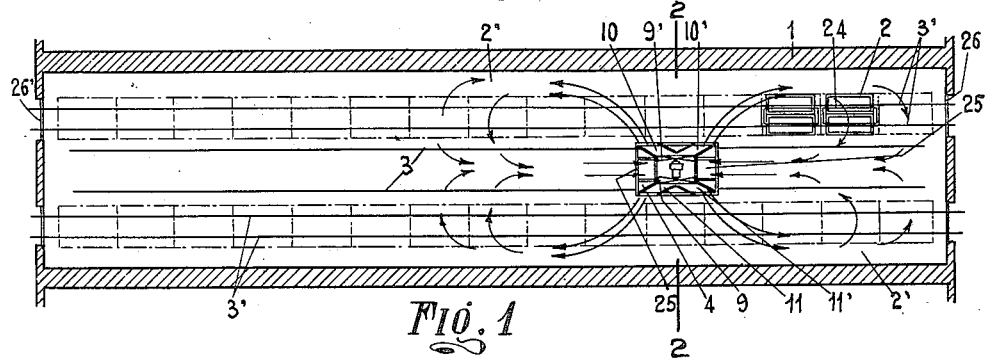
Figure 5:
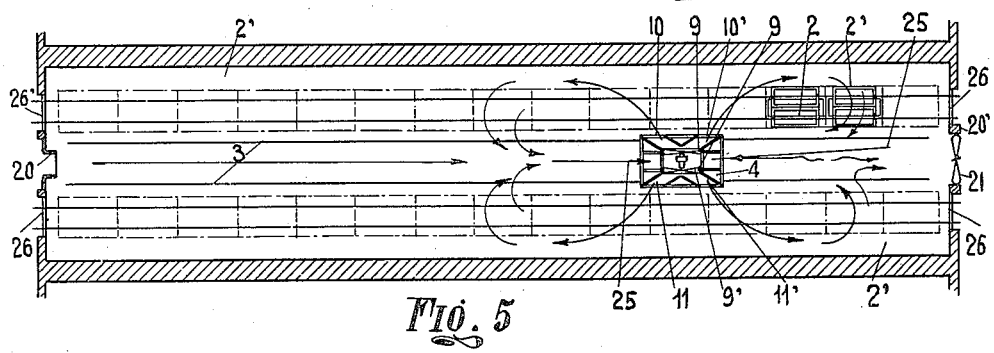
Figure 6:
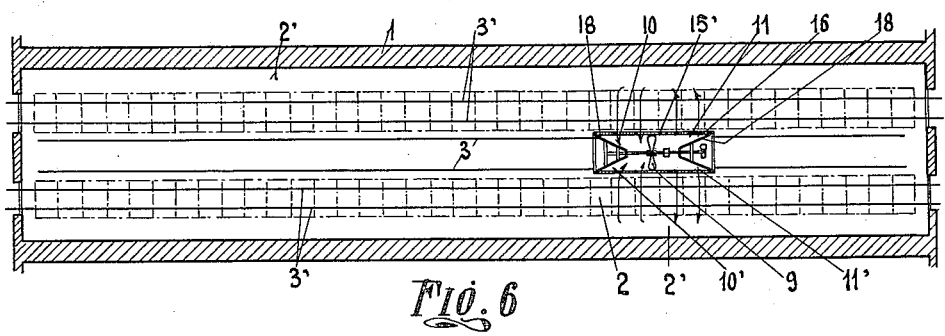
Figure 7:
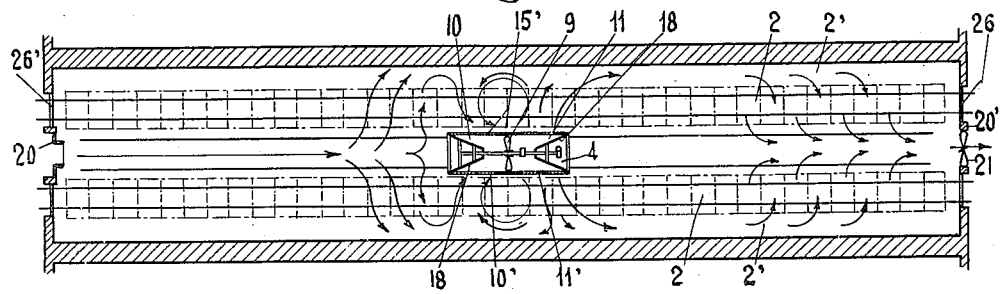

On the annexed drawing: Figure 1 is a plan view with parts in section of a drying room according to this invention; Figure 2 is a transverse section to an enlarged scale on line 2—2 of Figure 1; Figure 3 shows another construction of drying room in vertical transverse section on 3—3 Figure 4; Figure 4 is a plan section on 4—4 of Figure 3; Figure 5 is a view similar to Figure 1 of another drying room having means for changing the air; Figure 6 is a similar view of a modified drying plant; Figure 7 is a similar view of a modified plant with means for the air change; Figure 8 is the transverse section of another construction of travelling ventilating device; Figure 9 is a horizontal section on line 9—9 of Figure 8; Figure 10 is a central vertical section of a modified travelling ventilating device; Figure 11 is the transverse section of the same on line 11—11 of Figure 10; Figure 12 is a transverse section of a drying room showing the air circulation produced by the travelling device; Figure 13 is a horizontal section on line 13—13 of Figure 12; Figure 14 is a transverse section of another drying room and Figure 15 is a similar section the travelling ventilating device being assumed to operate under different conditions.

The plant shown by Figures 1 and 2 comprises a room 1 in which the supports 2 for the material to be dried are carried by trucks 24 moving along tracks 3' located at such a distance from the adjacent side wall of the room as to leave a free space 2' between the said material supports and the wall. On a track 3 located in the longitudinal central space of the room is mounted to reciprocate a wheeled frame 5 carrying a travelling ventilating device 4 whose mouths 10—10'—11—11' open in front to the material supports 2.

The mouths 10—10' on one side, and 11—11' on the other side, converge towards the centre of the respective propellers 9—9', each of which forces through the mouths in front of it the air it draws from the room through the end ports 25.

Figures 3 and 4 show a ventilating device adapted for a room providing space for a single row of material supporting trucks 24; this ventilating device comprises two propellers 9—9' located above each other and both driving air towards the material supports 2.

In the mouths 10—10', 11—11' which are provided by baffles 18, are located transverse horizontal blades 15 for the purpose of producing air sheets entering the spaces between the supports 2 carrying the material.

Of course the said propellers 9—9' may be operated in the same or in opposite direction to produce different ventilating conditions.

The constructions described in connection with Figures 1-5 are more particularly adapted for drying materials located on supporting surfaces.

The mouths 10—10' and 11—11' are inclined to a comparatively small angle with regard to the line of travel of the travelling ventilating device, for the purpose of obtaining that the air streams issuing therefrom and passing between the material supports 2 are directed back by the room wall against which they impinge; thus during the travel of the ventilating device the material is acted on in succession by two air streams having opposite directions (see Figures 1 and 5).

In the construction of Figure 6 the travelling ventilating device comprises a single propeller 9 located in a casing 4 having ports 10—10'—11—11' opening adjacent the suction and exhaust sides of the propeller and provided with deflecting baffles 18 which are intended to direct the air in a direction transverse to the line of travel of the device; through said ports are produced opposed currents which act subsequently in two opposite directions on the material, as it has been found useful in connection with the drying of cheeses and sausages.

In this construction vertical partitions 15' are located in said ports for the purpose of producing air sheets from the stream generated by the propeller and of driving the same sheets in a direction substantially perpendicular to the line of travel of the ventilating device, Figures 8–11 show apparatus for producing air streams circulating around a horizontal axis substantially parallel with the line of travel of the travelling ventilating device. The construction of Figures 8–9 comprises a casing 4 having a nearly square cross section and a rear wall in the shape of a half cylinder; a propeller 9 is located in said casing nearly in its intermediate portion, and produces an air circulation through the casing and the space in front of it. Figures 10—11 show a similar casing adapted to produce an air circulation of the same character in the space in front of both sides of the casing. This casing comprises partitions as 15″ for deflecting the air stream produced by the propeller 9 and it is mounted on a truck 5 having propelling means as an electromotor 22.

Figures 12 and 13 show a construction in which the truck 5 carries a ventilating device comprising two casings 4—4′ each having a propeller 9—9′ with vertical axis arranged near an opening of the top horizontal wall. Each casing is provided on each side wall with an opening 23 in which are located blades 17 which may be rotated around a longitudinal axis for the purpose of adjusting the direction of the air streams issuing through the said openings.

In this construction the two openings 23 of each casing act in the same manner, that is they are both exhaust or inlet ones according to the operation of the respective propeller; by adjusting the position of the blades 17 a very efficient drying action may be exerted on the lower edge of the articles to be dried, at which edge usually collects a larger amount of moisture.

The top mouth of the casing 4 or 4′ may be provided with a perforated cover 18′ having blades 19 (Figure 15) for the purpose of directing the air stream.

Figures 14 and 15 give an idea of the air circulation which may be produced in the room by the described means.

In the described drying plants means may be provided for producing an air change in the room.

An arrangement of this kind is illustrated in connection with Figure 5, the end walls of the drying room having ports 20—20′ of which the latter is provided with an air propeller 21.

The air propelled by the propeller 21 produces a stream which meets the air stream produced by the propeller of the travelling ventilating device and combines therewith to produce a ventilation of the kind shown by arrows in Figure 5.

A similar result is obtained in connection with the construction of Figure 7.

In the constructions illustrated and described the drier is assumed to be a tunnel one, it being assumed that the material carrying trucks are introduced in the drier through the door 26 and removed therefrom through the opposite door 26′ after the drying is completed; in this case it is useful that the direction of the air stream produced in the room for change of the air is directed opposite the direction of progression of the trucks in the same room.

The propellers may be actuated by any conventional manner their drive being shown in the drawing as produced by an electromotor 24 but it is to be understood that the propellers may be driven by any desired means and that they may be of any desired construction.

The travelling casing is driven by an electromotor 22 which produces its running, but any other means for the carriage drive may be used if preferred.

As above described, it is useful that the fresh air entering the room is directed opposite to the direction of progression of the material, as shown by Figures 5 and 7, because the advantage is obtained that said fresh air is mixed with the air of the room and the material is treated by air having the same character as to moisture content and temperature throughout the room, while in known tunnel driers there is a large difference in the temperature and moisture content of the air in the several portions of the room.

Finally by the arrangement described in this invention the several portions of the material located at different heights are dried to a substantially even extent, and the accumulation of hot air in top portions of the room is prevented.

What I claim as my invention and desire to secure by United States Letters Patent is:

1. A drying plant comprising, a room, means along the room for supporting material to be dried, a ventilating device reciprocable along the supporting means, the ventilating device including a casing having openings in its walls facing the supporting means, and ventilating means inside the casing for producing an air blast stream through the openings of each casing wall facing said supporting means.

2. A drying plant comprising, a room, means along the room for supporting material to be dried, a ventilating device reciprocable along the supporting means, the ventilating device including a casing having openings in its walls facing the supporting means, and ventilating means inside the casing for producing air streams issuing from the ventilating device and acting in the zone for the material, faced at the time by the opposite wall of the device, and returning to the ventilating device.

3. A drying plant comprising, a room, means along the room for supporting the material to be dried, a ventilating device reciprocable along the supporting means, the ventilating device including a casing having openings in its walls facing the supporting means, ventilating means inside said casing for producing an air stream, and means in the casing for deflecting said air stream towards the openings of the walls facing the zone intended to be occupied by the material.

4. A drying plant comprising, a room, means along the room for supporting material to be dried, a ventilating device reciprocable along the supporting means, the ventilating device including a casing having openings in its walls facing the supporting means, ventilating means inside the casing, the ventilating means including an air propeller rotatable on an axis positioned in the direction of travel of the device, and means at the front and at the rear of the propeller for deflecting air streams produced by the propeller, in a direction transverse to the path of the device.

5. A drying plant comprising, a room, means along the room for supporting the material to be dried, a ventilating device reciprocable along said supporting means, said ventilating device including a casing having openings in its walls facing said supporting means and ventilating means inside said casing, said ventilating means including at least an air propeller rotating about an axis in the direction of the travel of said device and means in front and at the rear of said propeller for deflecting the air stream produced by the said air propeller towards the adjacent openings of the two side walls of said ventilating device.

In testimony whereof, I have signed my name to this specification.

PILADE BARDUCCI.